United States Patent [19]

Stohrer

[11] 4,235,530
[45] Nov. 25, 1980

[54] NOSEPAD FOR SPECTACLES

[76] Inventor: Kurt Stohrer, Lerchenweg 18, 7030 Boblingen, Fed. Rep. of Germany

[21] Appl. No.: 33,309

[22] Filed: Apr. 25, 1979

[30] Foreign Application Priority Data

Apr. 29, 1978 [DE] Fed. Rep. of Germany ....... 2819141

[51] Int. Cl.³ .......................... G01N 21/41; G01C 1/06
[52] U.S. Cl. .................................... 351/136; 351/139; 351/132
[58] Field of Search ............... 351/132, 137, 138, 139, 351/88, 76, 77, 78, 79, 80, 81

[56] References Cited

U.S. PATENT DOCUMENTS 1,068,140  7/1913  Johnston ............................. 351/37
2,089,234  8/1937  Welsh ................................. 351/139

FOREIGN PATENT DOCUMENTS 24124 of 1903 United Kingdom ..................... 351/137

*Primary Examiner*—John K. Corbin
*Assistant Examiner*—Rodney B. Bovernick

[57] ABSTRACT

An eyeglass frame pad of SYLGARD No. 186 resin has a sleeve therein of Rilsan polyamide. The sleeve has a blind hole for receiving the flat end area of a metallic pad lever which is affixed to the eyeglass frame. The sleeve has vanes extending on either side which have holes therein and a negative sweep at their upper ends. The sleeve and its vanes are moulded in this pad. Subsequently, the pad lever is inserted in the sleeve.

8 Claims, 4 Drawing Figures

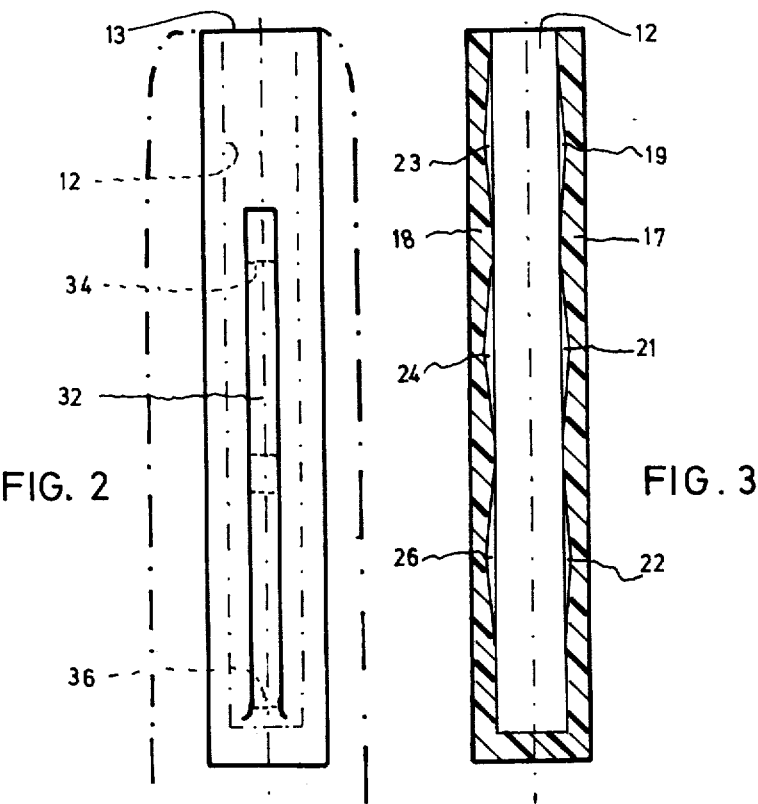

NOSEPAD FOR SPECTACLES

This invention relates to a pad to be placed on the area of the root of the nose of persons wearing glasses provided with frames, which pad is made of the silicon resin SYLGARD (registered trademark) No. 186 of DOW CORNING (according to Patent Application, p 27 39 905.9, West Germany).

BACKGROUND OF THE INVENTION

If the pads are not joined directly to the rim of the glasses but are fastened to pad levers, the connection between the metal pad lever and the silicon/caoutchouc pad presents difficulties. The pad levers can in the long run pierce the very soft silicon/caoutchouc, even if their front surface has been carefully rounded.

The prevention of rotary movements of the pad relative to the pad lever is even more difficult than is the prevention of axial movements thereof. So far, there does not exist any adhesive which in the long run fulfils the requirements to be met, although adhesive technology is very far advanced.

OBJECTS AND STATEMENT OF THE INVENTION

The objects of the invention are to provide a device whereby the end area of the pad lever can be reliably used industrially in a cheap manner and one that allows mass production in conjunction with SYLGARD No. 186 of Dow Corning, of the pad proper.

According to the invention, this problem is solved by the following features:

(a) A thin sleeve consisting of a semi-flexible natural-coloured injection-moulded polyamide has approximately the length of the end area of the pad lever and a blind hole which ends on the upper edge of the pad and which has a shape allowing the subsequent flush insertion of the flat end area.

(b) The sleeve has a substantially smaller volume than the pad.

(c) The sleeve extends approximately in the centre line of the pad.

(d) The sleeve is provided with retaining elements on the outside.

The polyamide is a polyamide 11 or a polyamide 12. These polyamides have had a great deal of proven success.

The polyamide is Rilsan (registered trade mark of ATO CHIMIE) of the BMOP 20 type. This polyamide provides excellent characteristics. The flexibility of the sleeve material lies between the pad and the lever in that it is sufficiently flexible so that the retaining elements can follow the movements of the silicon resin but, on the other hand, it is so firm that the pad lever has to be glued to the sleeve only for pure reasons of precaution. This type is fast to light and does not become discoloured even at high temperatures, e.g. during welding. This is important in that there must not be formed after a few years a yellowish or brown dendrite within the natural-coloured silicon resin.

The length of the sleeve is about ⅔ of the length of the pad. This feature ensures that approximately the lower third of the pad is capable of freely adapting itself, an area which individually has to adjust most severely to different radii.

The retaining elements extend in the larger center plane of a flat kidney-shaped pad. This feature causes the pad to remain homogeneous to a depth that is considerable. The retaining elements do not leave impressions on the outside and furthermore they have the greatest possibility of expanding in this centre plane without disturbing the wearability of the pad.

The retaining elements are very thin vanes on either side of the sleeve, which vanes have openings therein. These features ensure that the "roots" of the pad passing through the openings are enclosed on all sides and there is accordingly no possibility of them escaping in any direction.

The vane front surface located in the direction of the open end of the sleeve is at a considerable distance from this end. This feature ensures that the front surface cannot be pressed through even when axial relative movements occur between the pad and the sleeve.

The vane front surface has a negative sweep. This feature causes this front surface to be additionally used as a retaining element.

BRIEF DESCRIPTION OF THE FIGURES

The invention will now be described with reference to a preferred exemplified embodiment. In the drawings:

FIG. 2 shows a side view of the sleeve, with the pad contour indicated in dash-dotted lines, FIG. 3 shows a section through the centre of the sleeve in the drawing plane of FIG. 2.

DETAILED DESCRIPTION OF THE INVENTION

Figure 1:
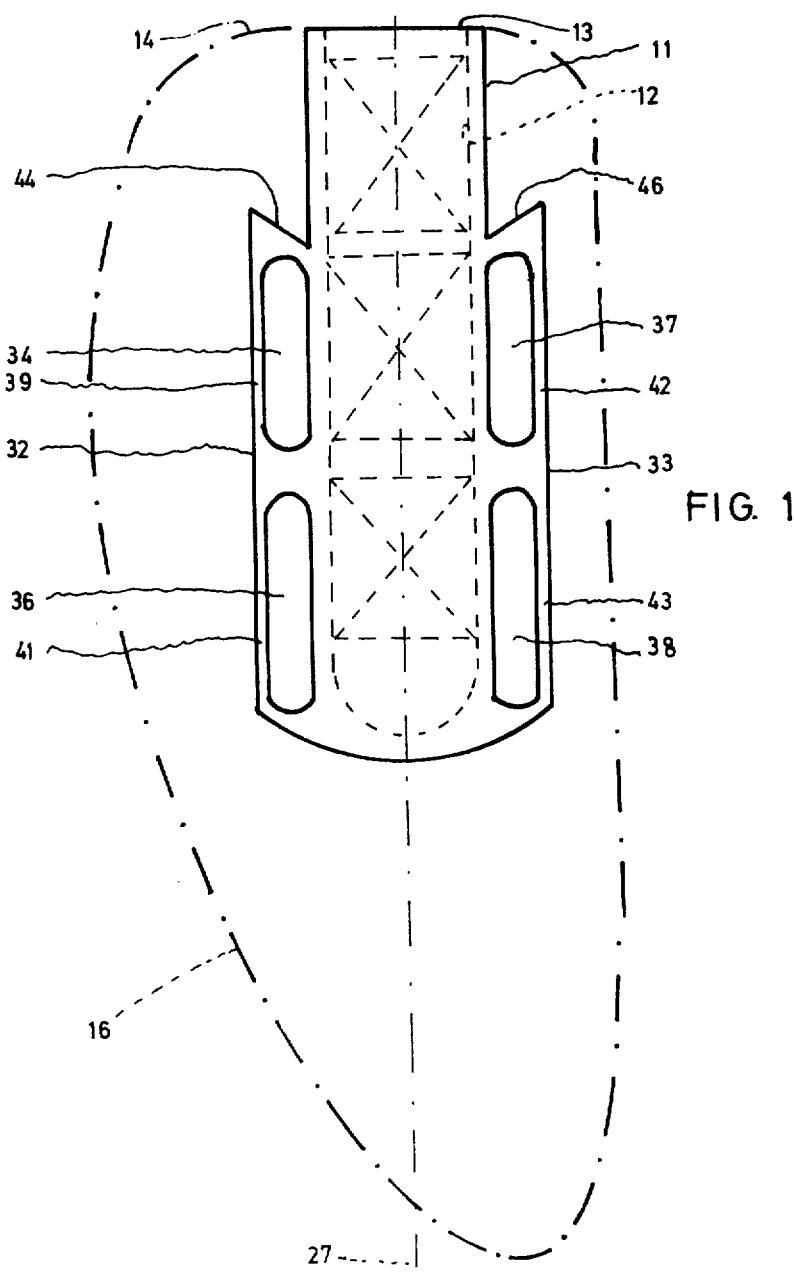
FIG. 1 shows a top view of a sleeve comprising a vane, the pad contour being shown in dash-dotted lines.

A sleeve 11 is injection-moulded and is shown to scale in a tenfold enlargement. When comparing FIG. 1 with FIGS. 2 and 3, one discerns that the contour of the sleeve is approximately in the shape of a rectangular parellelepiped. It has a blind hole 12. Its upper front surface 13 is aligned with the upper edge area 14 of a pad 16, so that the blind hole 12 is freely accessible from the top. Both the cover 17 and the bottom 18 have opposite indentations 19, 21, 22, 23, 24, 26 in the shape of quadrangular pyramids, which indentations are very shallow so that the complementarily formed injection-moulding die can be pulled out, despite the undercuts thus formed, without having to divide the die. As can be seen in FIG. 1, the points of the indentations are located in a centre plane 27, which also divides the blind hole 12 into two equal halves.

Figure 4:
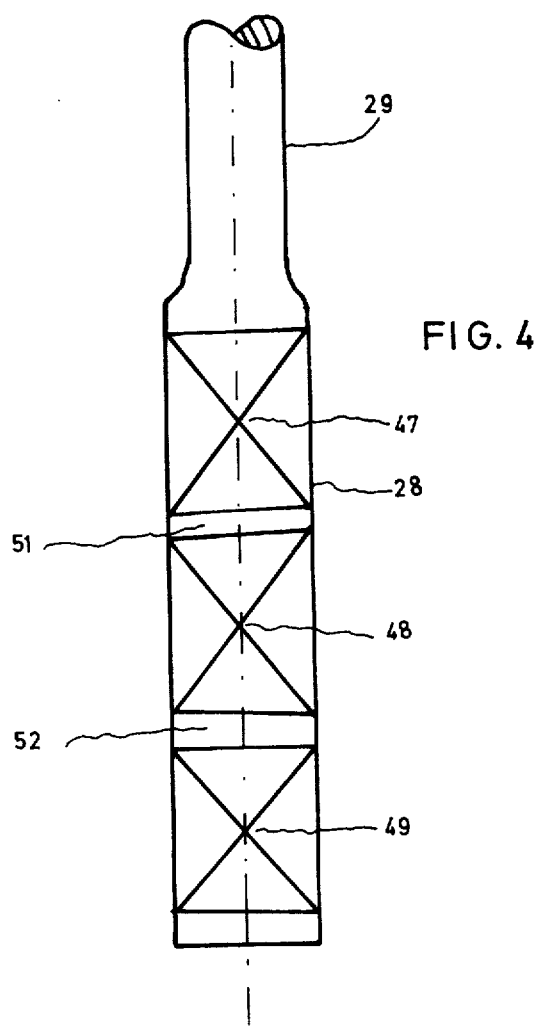
FIG. 4 shows a top view of the end area of a pad lever in a position in which it fits into the sleeve shown in FIG. 1.

The wall thickness of the sleeve 11 is 3/10 mm and is thus practically not bulky on an end area 28 of a pad lever 29 (FIG. 4).

In the centre plane 31 which, according to FIG. 1, lies in the drawing plane and which is also the centre plane of the pad 16, there are provided on either side of the sleeve 11 vanes 32, 33 which are identical shape so that there is no need to take care of positional accuracy when the sleeve 11 is injected or cast into the pad 16. By the terms vanes, a thin rib - structure is intended, which is thin relative to the pad 16 and this sleeve 11. The vanes 32, 33 are approximately 0.7 mm thick and each has two openings 34, 36, 37, 38, leaving thin webs 39, 41, 42, 43 on the outside. The silicon resin flows through the openings 34 to 38 during the manufacturing process and is thus positively rooted to the vanes 32, 33 all round. However, the openings 34, 36, 37, 38 also leave the pad 16 its transparency in a practically undisturbed manner and, since the vanes 32, 33 are thin, they nevertheless participate in movements. The sleeve 11 is of natural colour, that is to say it is not conspicuous in the pad 16 because this latter is also of natural colour and the end area 28 only is seen.

The upper front surface 44, 46 of the vanes 32, 33 shown in FIG. 1 has, according to FIG. 1, a negative sweep or hooked-shaped structure and consequently retention characteristics.

According to FIG. 4, the pad lever 29 is of largely circular cross section. However, its end area 28 is deformed flat and shows on the upper side as well as on the underside flat pyramid-shaped elevations 47, 48, 49 in the form of quadrilateral pyramids. Between each elevation 47, 48, 49 there is provided a valley 51, 52.

Such an end area 28 is pushed into the sleeve 11 during the assembly; if necessary, by applying adhesive. The configuration of the end area 28 is embossed, and since the embossing die keeps its shape, one always has the same geometry of the elevations 47, 48, 49. If the tool for forming the blind hole is 12 is made so as to be identical with the end area 28, then one can be sure that a very high fit will be achieved in an inexpensive manner.

In order to improve the introduction of the end area 28, it may be rounded at the bottom.

I claim:

1. A pad to be fastened to the end areas of metallic pad levers affixed to eyeglass frames and placed on the area of the root of the nose of persons wearing said eyeglass frames, which pad is made of the silicon resin SYLGARD, comprising:

a sleeve in the pad which is thin relative to the pad and has a flexibility lying between the pad and the pad lever, and which is composed of an injection-molded polyamide material of natural-color and has approximately the length of the end area of the pad lever and a blind hole with its opening at the upper edge of the pad and which has a shape allowing the flush insertion therein of the end area of the pad lever;

said sleeve having a substantially smaller volume than the pad;

said sleeve extending approximately in the center line of the pad; and said sleeve being provided with pad retaining elements on the outside thereof said retaining elements comprising thin vanes on either side of said sleeve having means on said vanes for securing the pad to said vanes.

2. A pad according to claim 1, in which the polyamide is a polyamide 11 or a polyamide 12.

3. A pad according to claim 1, in which the polyamide is Rilsan of the BMOP 20 type.

4. A pad according to claim 1, in which the length of said sleeve is about ⅔ of the length of the pad.

5. A pad according to claim 1, in which the said retaining elements extend in the larger center plane of a flat kidney-shaped pad.

6. A pad according to claims 1 or 5, in which said retaining elements are very thin vanes which vanes have openings therein.

7. A pad according to claim 6, in which the vane front surface located in the direction of the open end of said sleeve is at a considerable distance from this end.

8. A pad according to claim 7, in which said vane front surface has a negative sweep.

* * * * *